US007279527B2

(12) United States Patent
Harwood et al.

(10) Patent No.: US 7,279,527 B2
(45) Date of Patent: Oct. 9, 2007

(54) METHOD OF CONVERTING ANIONIC LIVING END TO PROTECTED FREE RADICAL LIVING END AND APPLICATIONS THEREOF

(75) Inventors: James Harwood, Stow, OH (US); James Oziomek, Cuyanoga Falls, OH (US); David F. Lawson, Uniontown, OH (US); James E. Hall, Mogadore, OH (US)

(73) Assignee: Bridgestone Corporation, Chuo-ku, Tokyo (JP)

( * ) Notice: Subject to any disclaimer, the term of this patent is extended or adjusted under 35 U.S.C. 154(b) by 0 days.

(21) Appl. No.: 11/112,997

(22) Filed: Apr. 22, 2005

(65) Prior Publication Data

US 2006/0241265 A1    Oct. 26, 2006

(51) Int. Cl.
C08F 281/00 (2006.01)
C08F 36/00 (2006.01)

(52) U.S. Cl. .................. 525/275; 525/267; 526/90; 526/335

(58) Field of Classification Search .............. 525/271, 525/267, 275; 526/335, 90
See application file for complete search history.

(56) References Cited

U.S. PATENT DOCUMENTS

| | | | |
|---|---|---|---|
| 4,068,050 A * | 1/1978 | Danzig et al. | 525/333.3 |
| 4,581,429 A | 4/1986 | Solomon et al. | |
| 4,960,831 A | 10/1990 | Willis et al. | |
| 5,077,346 A * | 12/1991 | Dias et al. | 525/383 |
| 5,322,912 A | 6/1994 | Georges et al. | |
| 5,401,804 A | 3/1995 | Georges et al. | |
| 5,549,998 A | 8/1996 | Georges et al. | |
| 5,627,248 A | 5/1997 | Koster et al. | |
| 5,677,388 A | 10/1997 | Koster et al. | |
| 5,721,320 A | 2/1998 | Priddy et al. | |
| 5,869,588 A * | 2/1999 | Toan et al. | 526/261 |
| 5,919,871 A | 7/1999 | Nicol et al. | |
| 5,959,033 A | 9/1999 | Demirors et al. | |
| 6,111,025 A | 8/2000 | Visger et al. | |
| 6,228,908 B1 * | 5/2001 | Takeichi et al. | 524/27 |
| 6,255,402 B1 | 7/2001 | Boutillier et al. | |
| 6,271,308 B1 | 8/2001 | de Boer et al. | |
| 6,333,381 B1 * | 12/2001 | Asada et al. | 525/71 |
| 6,353,065 B1 | 3/2002 | Charleux et al. | |
| 6,362,269 B1 * | 3/2002 | Ishihata et al. | 524/449 |
| 6,369,162 B1 | 4/2002 | Visger et al. | |
| 6,376,615 B1 | 4/2002 | Guerrero-Santos et al. | |
| 6,420,502 B1 | 7/2002 | Chung | |
| 6,444,754 B1 | 9/2002 | Chin et al. | |
| 6,521,710 B1 | 2/2003 | Roth et al. | |
| 6,525,140 B1 | 2/2003 | Dedecker | |
| 6,525,151 B1 | 2/2003 | Roth et al. | |
| 6,531,547 B1 | 3/2003 | Visger et al. | |
| 6,624,263 B2 * | 9/2003 | Matyjaszewski et al. | 526/90 |
| 6,673,892 B2 | 1/2004 | Martinez et al. | |
| 6,762,218 B2 * | 7/2004 | Geprags et al. | 523/214 |
| 6,780,917 B2 * | 8/2004 | Hashimoto et al. | 524/456 |
| 2002/0045685 A1 | 4/2002 | Ogoe et al. | |
| 2003/0050411 A1 | 3/2003 | Gaynor et al. | |
| 2003/0065097 A1 | 4/2003 | De Groot et al. | |
| 2004/0030021 A1 * | 2/2004 | Mitsunaga et al. | 524/442 |
| 2004/0157994 A1 * | 8/2004 | Kubo et al. | 525/88 |

FOREIGN PATENT DOCUMENTS

| | | |
|---|---|---|
| WO | WO/97/36894 A | 10/1997 |
| WO | WO/97/49741 A | 12/1997 |
| WO | WO/97/49742 A | 12/1997 |
| WO | WO99/46261 | 9/1999 |
| WO | WO 02/48109 | 6/2002 |

OTHER PUBLICATIONS

"Synthesis of Rod-Coil Diblock Copolymers via Nitroxide Functionalized Mesogenic Rod Segments" by Padma Gopalan, Xuefa Li, Christopher K. Ober and Craig Hawker, Department of Materials Science and Engineering, Cornell University, Ithaca, NY 14852, *Polymer Preprints* 2002, 43 (2), 110.

"Butyl Acrylate Polymerization Mediated by a Proxyl Nitroxide" by Neil R. Cameron and Alistair J. Reid, Department of Chemistry, University of Durham, South Road, Durham, DH1 3LE, U.K., *Polymer Preprints* 2002, 43 (2), 88.

"Stable Free Radical Polymerization Process—Initiation Mechanisms with Benzoyl Peroxide and Various Nitroxides" by Michael K. Georges, Gordon Hamer, Andrea R. Szkurhan, Argang Kazemedah, Joanne Li, Department of Chemistry, University of Toronto, 359 Mississauga Rd. N., Mississauga, On. L5L 1C6, *Polymer Preprints* 2002, 43 (2), 78.

"New Concepts for Controlled Radical Polymerization: The DPE-System" by Oskar Nuyken, Philipp C. Weiland, Yvonne Heischkel and Benedikt Raether, Lehrstuhl Für Makromoleculare Stoffe, TU Munchen, D-85747 Garching, Germany, *Polymer Preprints* 2002, 43(2), 84.

"Utility/Limitations of Nitroxide Mediated Polymerization for Low Cost Manufacture of Improved Styrenic Polymers" by Duane B. Priddy and Bob A. Howell, Center for Applications in Polymer Science, Central Michigan University, Mt. Pleasant, MI 48859-0001, *Polymer Preprints* 2002, 43 (2), 102.

"Boroxyl-Based Living Free Radical Initiators" by H. Han, G. Xu, and T. C. Chung, Dept. of Materials Science and Engineering, The Pennsylvania State University, University Park, PA 16082, *Polymer Preprints* 2002, 43 (2), 82.

(Continued)

*Primary Examiner*—David W. Wu
*Assistant Examiner*—M. Bernshteyn
(74) *Attorney, Agent, or Firm*—Jenny L. Sheaffer; Meredith E. Hooker

(57) ABSTRACT

Provided is a method of converting an anionic living end to a protected free radical "living" end in a well-controlled manner, which enables copolymerization by plural mechanisms. The method is particularly useful for copolymerization of anionically polymerizable monomers and free radical polymerizable monomers, and therefore useful for production of PB-g-PS, HIPS, ABS, and MBS etc. Also provided is a reversibly coupled polymer, which, when decoupled, generates "living" free radical for further copolymer chain reaction.

27 Claims, 11 Drawing Sheets

OTHER PUBLICATIONS

An article entitled "Nitroxyl Based Controlled Free Radical Polymerization—An Additives Manufacturer's Approach," presentation at "Commercialization of Controlled Polymer Synthesis," San Francisco, Sep. 16-17, 1999 by Rudolf Pfaendner, Wiebke Wunderlich, Michael Roth of Ciba Spezialitatenchemie Lampertheim GmbH, Lampertheim, Germany; Andreas Kramer, Francesco Fuso, Peter Nesvadba of Ciba Specialty Chemicals, Inc. Basel, Switzerland.

An article entitled: "Block Copolymer Synthesis by Styrene Polymerization Initiated with Nitroxy-Functionalized Polybutadiene" by Seiya Kobatake, H. James Harwood and Roderic P. Quirk, Maurice Morton Institute of Polymer Science, The University of Akron, Akron, OH 44325-3909, Duane B. Priddy, Polystyrene R&D, The Dow Chemical Co., Midland, MI 48667; *Macromolecules* preprinted from vol. 31, No. 11, pp. 3735-3739.

An article entitled: "Compatibilization of poly(phenylene ether) and polyamide-6,6 blends by functionalized polystyrenes," by Chin, Hui H. Annual Technical Conference—SPE (2002) 60th (Vo. 2) 1329-1333, Abstract only.

Polymer Preprints, "Synthesis, Characterization and Evaluation of Initiators for Living Free Radical Polymerization: Synthesis of Polystyrene with Controlled Structure", Irene Li et al., vol. 36, No. 1 pp. 469-470 (1995).

Macromolecules, "Narrow Molecular Weight Resins by a Free-Radical Polymerization Process", M.K. Georges et al. 26, 2987-2988 (1993).

J. Am. Chem. Soc., "Molecular Weight Control by a Living Free-Radical Polymerization Process", C.J. Hawker, 116, 11185-11186 (1994).

Chemistry in Australia, "Living Free Radical Polymerization", E.Rizzardo, p. 32 (1987).

J. Org. Chem., "Reaction of n-Butyllithium and 2,2,6,6-Tetramethylpiperidine Nitroxyl". G.M> Whitesides et al., vol. 40, No. 23, pp. 3448-3450 (1975).

Makromol. Chem., Rapid Commun., "Reactions of Benzoyloxyl Radicals with Some Common Vinyl Monomers", Graeme Moad et al., pp. 533-536 (1992).

Braun, D., "Alkane Als Initiatoren Zur Radikalischen Polymerisation", *Angewandte Makromolekulare Chemie*, vol. 223, Issue 1, pp. 69-79, Published online: Mar. 12, 2003, Copyright 1994 Huthig & Wepf Verlag, Zug (Englished Abstract).

Frolov, V.M., et al., "Hydrogenation of Polybutadiene and Butadiene—Vinyltrimethylsilane Copolymers in the Presence of Metal-Complex Catalysts", *Journal of Polymer Science*, Ser. A., vol. 43, No. 11, , pp. 1114-1118 (2001).

Jayaraman, R.B., Facinelli, J.V., Riffle, J.S., George, S.E., "Epoxy and Hydroxy Functional Polyolefin Macromonomers", *Journal of Polymer Science: Part A: Polymer Chemistry*, vol. 34, pp. 1543-1552 (1996).

Quirk, R., Yoo, T., Cheong, T.H., Schwindeman, J.A., Brockman, T., "Anionic Synthesis of Amine-Functionalized Polybutadienes and Their Hydrogenated Analogs", *Polymer Preprints* 2002, 43(2), 974.

Raether, B., Nuyken, O., Wieland, P., Bremser, W., "Free-Radical Synthesis of Block Copolymers on an Industrial Scale", *Macromolecules Symp.* 177, 25-41 (2002).

Tharanikkarasu, K., Radhakrishnan, G., "Tetraphenylethane Iniferters: Polyurethane-Polystyrene Multiblock Copolymers Through 'Living' Radical Polymerization", *Journal of Applied Polymer Science*, vol. 66, 1551-1560 (1997).

An article entitled: "Block Copolymer Synthesis by Styrene Polymerization Initiated with Nitroxy-Functionalized Polybutadiene" by Seiya Kobatake, H. James Harwood and Roderic P. Quirk, Maurice Morton Institute of Polymer Science, The University of Akron, Akron, OH 44325-3909, Duane B. Priddy, Polystyrene R&D, The Dow Chemical Co., Midland, MI 48667; *Macromolecules* preprinted from vol. 31, No. 11, pp. 3735-3739, (1998).

* cited by examiner

METHOD OF CONVERTING ANIONIC LIVING END TO PROTECTED FREE RADICAL LIVING END AND APPLICATIONS THEREOF

BACKGROUND OF THE INVENTION

The present invention is generally related to a method of converting an anionic living end to a protected free radical "living" end in a well-controlled manner, which enables copolymerization by plural mechanisms. The method is particularly useful for copolymerization of anionically polymerizable monomers and free radical polymerizable monomers, and therefore useful for production of PB-g-PS, HIPS, ABS, TIPS and MBS etc. The present invention also provides a reversibly coupled polymer, which, when decoupled, generates "living" free radical for further copolymer chain reaction.

Copolymerization is one of the most widely used techniques in the polymer industries. For example, copolymerization of styrene and butadiene is necessary in preparing rubber modified styrenic polymers such as high impact polystyrene (HIPS), acrylonitrile/butadiene/styrene (ABS) resins, and methylmethacrylate-butadiene-styrene (MBS) resins.

ABS resin generally comprises a rigid matrix copolymer phase of styrene and acrylonitrile monomers having dispersed therein a graft copolymer of a butadiene rubber substrate grafted with the styrene/acrylonitrile copolymer. ABS resins are most often produced by initially preparing a polybutadiene seed latex and copolymerizing styrene and acrylonitrile in emulsion in the presence thereof.

Rubber-reinforced polymer compositions of the HIPS type are widely used in many applications because of their ease of molding, good gloss, and generally good mechanical properties. HIPS polymers are usually formed by incorporation of polybutadiene (PB) phase in polystyrene (PS) through the in situ formation of PB-graft-PS. Early in the polymerization, phase separation begins because of the immiscibility of the rubber within the polystyrene being formed and the depletion of the styrene phase. The immiscibility of PB in PS and the in situ formation of the compatibilizer, PB-graft-PS, give rise to the formation of varied morphologies, for example, of the lamellar, globular, capsule, and other types. These microstructures are responsible for the absorption of energy when the material is subjected to high intensity (impact) or low intensity (tension) forces.

Typically, a conventional process for the preparation of HIPS consists of polymerizing a styrene monomer (or other vinyl aromatic monomer) in the presence of an appropriate quantity of polybutadiene or butadiene copolymer. For example, such polymers can be manufactured by the polymerization of styrene in the presence of 5-20% dissolved polybutadiene or butadiene copolymer rubber.

However, the technology of converting an anionic living end to a protected free radical "living" end has not been developed. Furthermore, the technology has not been utilized in, for example, copolymerization of butadiene and styrene, or industrial production of HIPS or ABS.

It is generally accepted that polymerization with a high degree of structure control are only possible by means of relatively complex methods, such as anionic, cationic or group transfer polymerization, but the choice of monomers is limited and the reactions demonstrate a high sensitivity to impurities. Conventional free radical polymerization shows tolerance to the presence of functional groups, but provides relatively poor structural control. Controlled free radical polymerization offers an opportunity to combine the advantages of conventional free radical polymerization with those of living ionic polymerization.

The present invention advantageously provides a method of converting an anionic living end to a protected free radical living end, and therefore also provides a copolymerization method using multiple mechanisms, i.e., anionic and free radical mechanisms. One of the merits obviously associated with the method is its ability to conveniently copolymerize anionically polymerizable monomers and free radical polymerizable monomers in a controlled manner. For example, this invention can be utilized to prepare butadiene polymers that will react with styrene monomer forming butadiene-g-styrene copolymer during styrene homopolymerization.

BRIEF DESCRIPTION OF THE INVENTION

One aspect of the present invention is to provide a method of converting an anionic living end to a protected free radical "living" end in a well-controlled manner, which enables copolymerization by plural mechanisms.

Another aspect of the present invention is to provide a copolymerization method for anionically polymerizable monomers and free radical polymerizable monomers, in which an anionic living end is converted to a protected free radical "living" end in a well-controlled manner.

Still another aspect of the present invention is to provide a reversibly coupled polymer, which, when decoupled, generates a "living" free radical for further copolymer chain reaction.

A further aspect of the present invention is to provide a method of producing PB-g-PS, in which an anionic living end is converted to a protected free radical "living" end in a well-controlled manner.

Another aspect of the present invention is to provide a method of producing PB-g-PS, in which a reversibly coupled polymer is used as an intermediate.

One further aspect of the present invention is to provide a method of producing HIPS, ABS, TIPS or MBS, in which an anionic living end is converted to a protected free radical "living" end in a well-controlled manner.

DETAILED DESCRIPTION OF THE INVENTION

Figure 1:
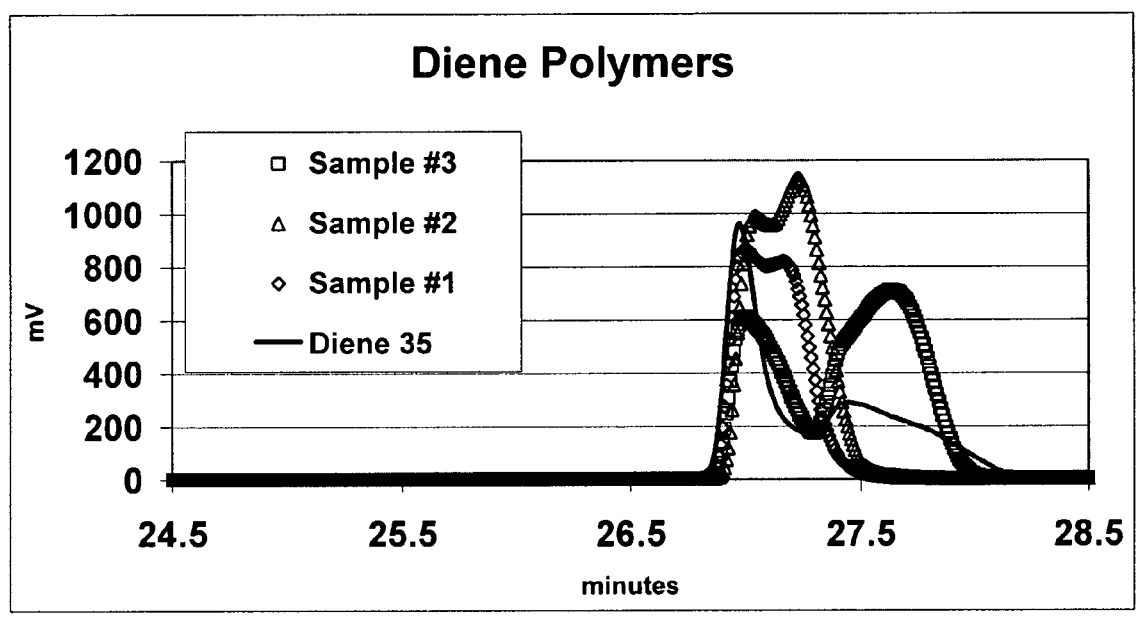
FIG. 1 shows the gradient GPC traces of a reversibly coupled end-capped poly(1,3-butadiene), an end-capped poly(1,3-butadiene), a control poly(1,3-butadiene), and a commercial polybutadiene made by Firestone Polymers LLC, "Diene 35" in one embodiment of the present invention. Diene 35 is an anionically prepared polybutadiene having a Mooney viscosity ~35 at 100° C. and used commercially in the production of HIPS in an embodiment of the present invention.

As will be explained hereinbelow, the present invention is generally related to a method of converting an anionic living end to a protected free radical "living" end and applications thereof in copolymerization such as HIPS preparation. The so-called protected free radical "living" end means a relatively weak bond that is capable of being homolytically cleaved in a controlled manner, and giving a free radical useful for initiating free radical polymerization. The term "copolymer" or "copolymerization" of the present invention should be interpreted to cover block copolymer, graft copolymer, statistical copolymer, gradient copolymer, random copolymer, periodic copolymer, and alternating copolymer etc.

In one embodiment, the method of converting an anionic living end to a protected free radical "living" end comprises reacting the anionic living end with a capping agent (CA) to produce an end-capped anionic living end, converting the ionic bond of the end-capped anionic living end to a homolytically cleavable covalent bond (HCCB) by functionalization with a homolytically cleavable group (HCG), breaking the HCCB bond homolytically (eg. by heating) to form an end-capped free radical; and optionally de-capping the end-capped free radical end to form an uncapped free radical.

The present copolymerization methodology converts an anionic living end to a protected free radical "living" end. An embodiment of the methodology is illustrated in the following scheme (I).

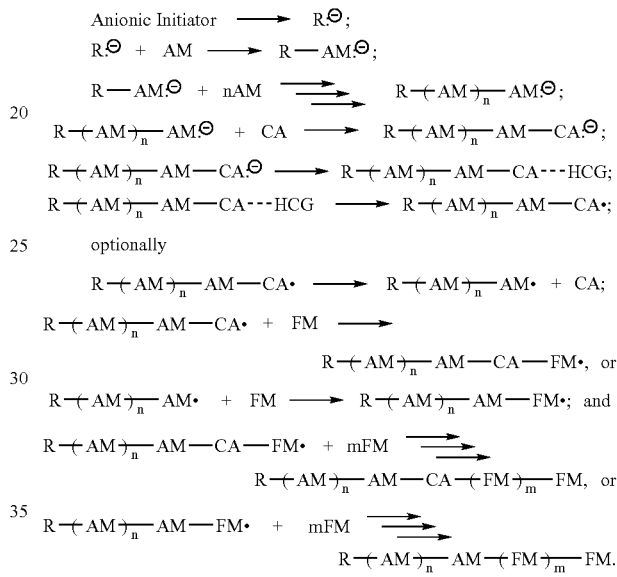

With reference to Scheme (I), the method in the embodiment includes reacting an anionic initiator with an anionically polymerizable monomer (AM) to provide an anionic living end;

propagating the AM chain with the anionic living end to a predetermined length with more, same or different, AMs;

reacting the anionic living end of the AM chain with a capping agent (CA) to produce an end-capped anionic living end;

converting the ionic bond of the end-capped anionic living end to a homolytically cleavable covalent bond (HCCB) by functionalization with a homolytically cleavable group (HCG);

breaking the HCCB bond homolytically to form an end-capped free radical;

optionally de-capping the end-capped free radical end to form an uncapped free radical.

adding the same or different free radical polymerizable monomers (FM) and initiating free radical polymerization in which the chain of AMs with a free radical, end-capped or not, functions as the free radical initiator.

The copolymerization of the present invention is therefore accomplished based on plural polymerization mechanisms, i.e. a combination of anionic mechanism and free radical mechanism.

In a specific embodiment of the present invention, the HCG group functionalized end-capped AM chain can be a reversibly coupled polymer as shown below:

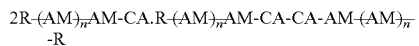

In this case, it should be understood that any one of the two end-capped AM chains in the reversibly coupled polymer serves as the HCG group for another one.

For example, the reversibly coupled polymer can be formed according to the following Scheme (II):

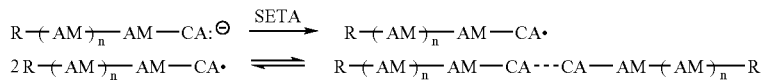

The method illustrated in Scheme (II) includes reacting the end-capped anionic living end with a single electron transfer agent (SETA) and thus converting the end-capped anionic living end to an end-capped free radical end; and reversibly coupling the end-capped free radical living ends.

Preferred anionically polymerizable monomers used in the present invention may be vinyl aromatic monomers, conjugated dienes, and ethylene. Specific examples of the anionically polymerizable monomers are conjugated dienes such as 1,3-butadiene, Isoprene (2-methyl-1,3-butadiene), 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene, and the like. Vinyl aromatic monomers include 1,2-diphenyl-4-methyl-1-hexene, styrene, α-methylstyrene, p-methylstyrene, vinyl toluene, vinyl anthracene, vinyl pyridines such as 2-vinylpyridine and 4-vinylpyridine, vinyl naphthalene such as 1-vinylnaphthalene, 2-vinylnaphthalene, 1-α-methylvinylnaphthalene, 2-α-methylvinylnaphthalene, and the like, and the mixture thereof. In some specific embodiments of the present invention, the monomers are 1,3-butadiene, isoprene, styrene, α-methylstyrene, and/or p-methyl styrene.

As the first step, anionically polymerizable monomers are subject to a living anionic polymerization, in which the kinetic-chain carriers are anions, or anionic living ends. As a skilled artisan can appreciate, the anionic living end typically is formed by nucleophilic addition of an anionic initiator to the monomer. Exemplary anionic initiators include organometallic compounds of the alkali metals. Other suitable anionic initiators include activated organometallic compounds of the Group II metals. For example, dialkyl magnesium activated with a group I metal alkoxide. Preferred anionic initiators in the present invention are organolithium compounds, which are known in the art as being useful in the polymerization of the anionically polymerizable monomers.

Suitable organolithium compounds include mono-lithium compounds represented by the formula as shown below:

$R_5Li$ wherein $R_5$ is a hydrocarbyl group containing 1 to 20, preferably 2-8, carbon atoms per $R_5$ group. Typical $R_5$ groups include aliphatic radicals and cycloaliphatic radicals, such as alkyl, cycloalkyl, cycloalkylalkyl, alkylcycloalkyl, alkenyl, aryl and alkylaryl radicals. Specific examples of $R_5$ groups include, but are not limited to, alkyls such as methyl, ethyl, n-propyl, isopropyl, n-butyl, isobutyl, t-butyl, n-amyl, isoamyl, n-hexyl, n-octyl, n-decyl, and the like; cycloalkyls and alkylcycloalkyl such as cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, and the like; cycloalkylalkyls such as cyclopentyl-methyl, cyclohexyl-ethyl, cyclopentyl-ethyl, methyl-cyclopentyl-ethyl, 4cyclohexylbutyl, and the like; alkenyls such as vinyl, propenyl, and the like; arylalkyls such as 4-phenylbutyl; aryls and alkylaryls such as phenyl, naphthyl, 4-butylphenyl, p-tolyl, and the like.

Suitable organolithium compounds also include multiple-lithium compounds. The multiple-lithium compounds include, but are not limited to, 1,4-dilithiobutane, 1,5-dilithiopentane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and the like, and the mixture thereof. According to the present invention, the preferred lithium initiators include n-butyllithium, sec-butyllithium, tert-butyllithium, 1,4-dilithiobutane, 1,3-(di-2-(2-lithio-4-methyl)pentenyl)benzene, and mixtures thereof.

The anionic initiator of the present invention is employed in an amount designed to result in the desired molecular weight of the reversibly coupled polymer. The ratio of millimoles of the anionic initiator per hundred grams of the anionically polymerizable monomer for use in the present invention ranges between 0.1 millimoles to 100 millimoles, preferably 0.2 millimoles to 20 millimoles, and most preferably, 0.5 millimoles to 4 millimoles.

The living chain consisting of anionically polymerizable monomers, i.e.

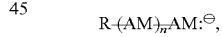

can be, for example, those illustrated as follows:

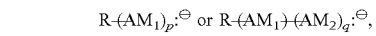

in which the R group is n-butyl, $AM_1$ is 1,3-butadiene, or isoprene, $AM_2$ is styrene, α-methylstyrene, or p-methylstyrene, and p and q can be any desired integral number. The preparation of these living chains can be accomplished, as specified in an embodiment of the present invention, in hexane at 40-140° C., using n-butyl lithium as the anionic initiator, and using 1,3-butadiene, styrene, α-methylstyrene, and p-methylstyrene as the anionically polymerizable monomers. Without intention to be bonded by any theory, the initiation and propagation steps of these exemplary polymerizations are illustrated in the following scheme (III):

Scheme (III)

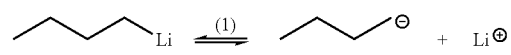

-continued

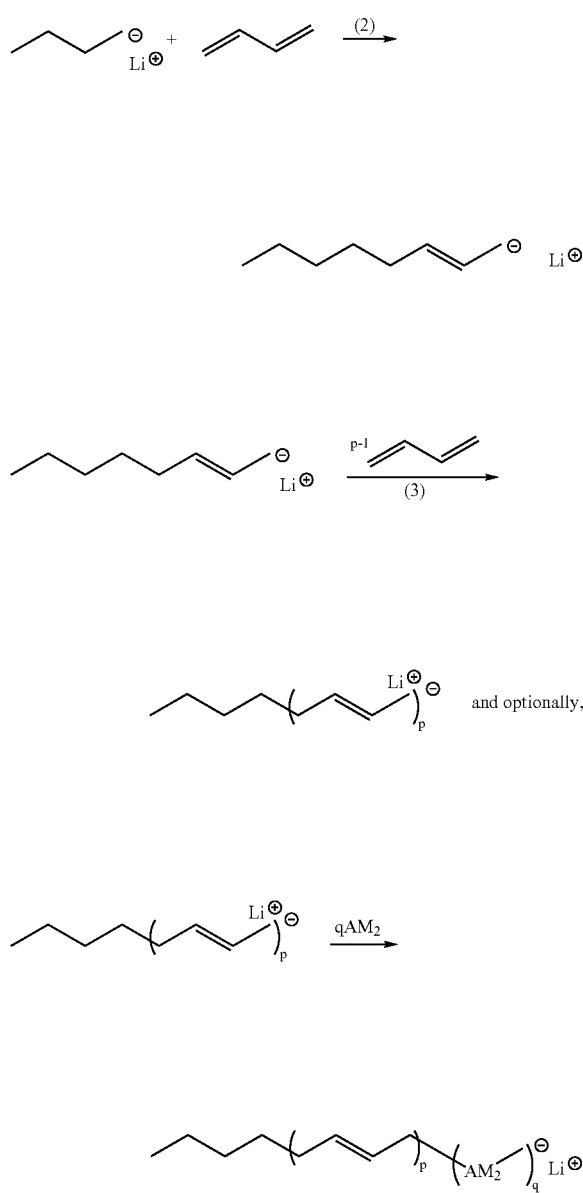

AM₂ = styrene, α-methylstyrene, or DIPB

It should be noted that, although the above Scheme (III) shows only 1,4-addition for the 1,3-butadiene polymerization, 1,2-addition can also occur along with the 1,4-addition. As such, for any conjugated diene monomer, a modifier is optionally used to control the 1,2-addition mechanism, to increase the reaction rate, and also to equalize the reactivity ratio of monomers. As a result, for one skilled in the art, the final 1,2-microstructure content of the conjugated diene polymers in the reversibly coupled polymer and the randomization of monomers in for example, SBR in the reversibly coupled polymer, can be controlled. Although any known modifier is contemplated within the present invention, a suitable 1,2-microstructure controlling agent is 2,2-bis(2-oxolanyl)propane.

Suitable 1,2-microstructure controlling agents include, but are not limited to, bis(2-oxolanyl)methane; 1,1-bis(2-oxolanyl)ethane; bistetrahydrofuryl propane (2,2-bis(2-oxolanyl)propane); 2,2-bis(5-methyl-2-oxolanyl)propane; 2,2-bis-(3,4,5-trimethyl-2-oxolanyl)propane; 2,5-bis(2-oxolanyl-2-propyl) oxolane; octamethylperhydrocyclotetrafurfurylene (cyclic tetramer); 2,2-bis(2-oxolanyl)butane; and the like. Other suitable modifiers include 1,2-dipiperidinoethane and tetramethylethylene diamine. A mixture of two or more 1,2-microstructure controlling agents also can be used. The preferred 1,2-microstructure controlling agents for use in the present invention are oligomeric oxolanyl propanes (OOPs) such as 2,2-bis(2-oxolanyl) propane.

The reaction conditions such as solvent and temperature for the anionic polymerization can be so finely controlled that they are compatible with the selection of the anionic initiator and the anionically polymerizable monomer. Some representative examples of suitable aliphatic solvents include n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. The polymerization temperature may vary over a broad range from about 30° C. to about 150° C., preferably from about 50° C. to about 110° C. The polymerization reaction is generally conducted for a time sufficient to obtain at least about 95% and preferably at least about 99% conversions. The molecular weight of the of the polymer ($M_n$, $M_w$, or $M_p$) is preferably in the range of about 10K to 550K, more preferably in the range of about 25K to 250K, and most preferably in the range of about 40K to about 150K.

It may be desirable to include other additives known in the art into the polymer formulation. Suitable additives include stabilizers, antioxidants, conventional fillers, processing aids, accelerators, extenders, curing agents, reinforcing agents, reinforcing resins, pigments, fragrances, and the like. Specific examples of useful antioxidants and stabilizers include 2-(2'-hydroxy-5'-methylphenyl)benzotriazole, nickel di-butyl-di-thiocarbamate, tris(nonylphenyl) phosphite, 2,6-di-t-butyl-4-methylphenol, and the like.

The anionic living end of the propagating chain is capped with a capping agent. Exemplary capping agent is a steric hindering compound as shown below, in which at least one of $R_{12}$ and $R_{14}$ are hindering groups such as cyclic and polycyclic aryl groups containing from 6 to 18 carbon atoms, and the other two groups can be each independently H, methyl, or ethyl.

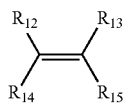

A specific example of capping agent is 1,1-diphenylethylene (DPE).

In a specific embodiment of the present invention, 1,1-diphenylethylene is used as the capping agent (CA), and the exemplary reaction is demonstrated below:

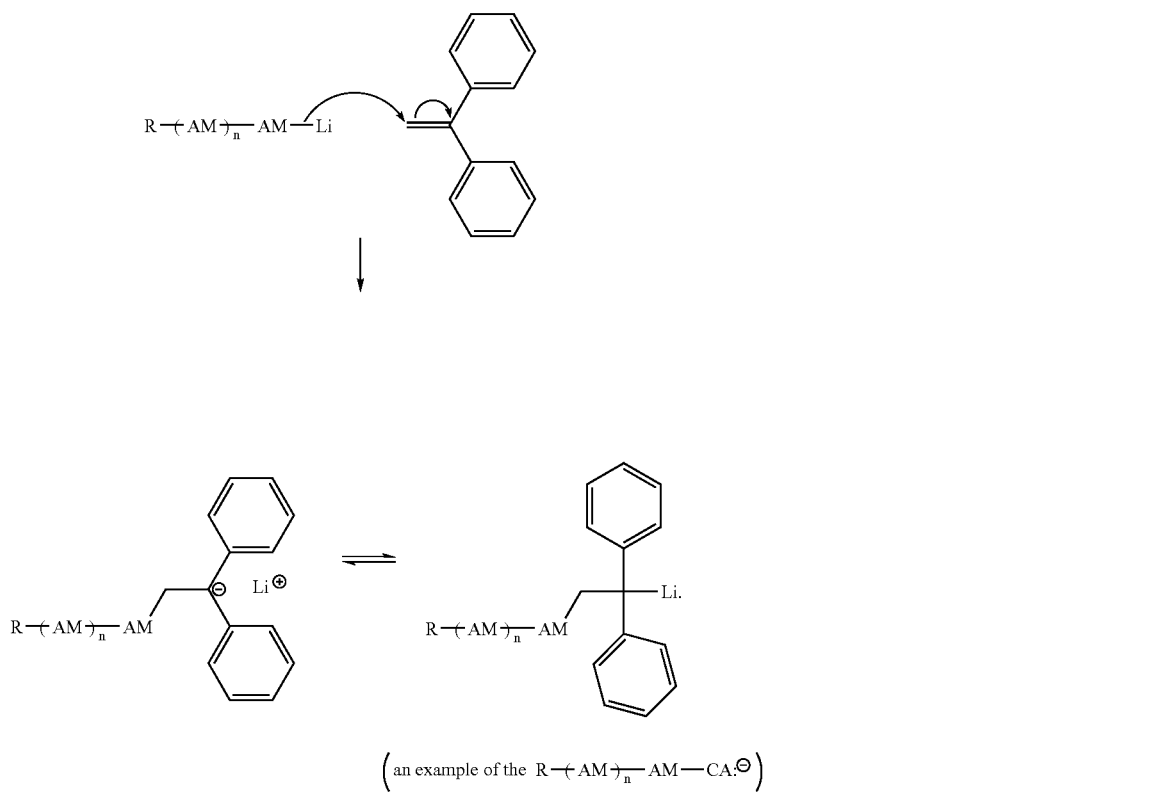

As described supra, the HCG group functionalized end-capped AM chain can be a reversibly coupled polymer as shown below:

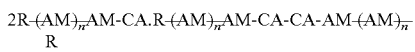

In this case, any one of the two end-capped AM chains in the reversibly coupled polymer can be understood as the HCG group for another one.

In a specific embodiment, the reversibly coupled polymer is formed according to the following scheme:

and then

The single electron transfer agent (SETA) can react with the end-capped anionic living end and thus convert the end-capped anionic living end to an end-capped free radical "living" end, two of which are capable of being reversibly coupled and protected.

Examples of the SETA agents include, but are not limited to, 1,2-dichloroethane, 1,2-dibromoethane, and benzyl bromide. In a specific embodiment of the present invention, 1,2-dibromoethane is used to convert two capped anionic living ends to a reversibly coupled and protected free radical living end as shown below.

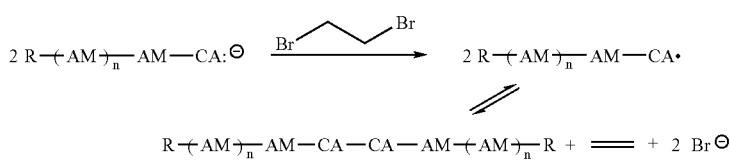

When the capping agent is, for example, DPE, without intention to be bound by any theory, the reaction is believed to occur according to the following mechanism.

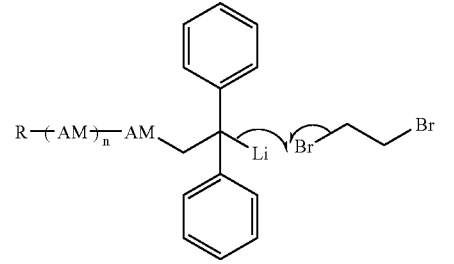

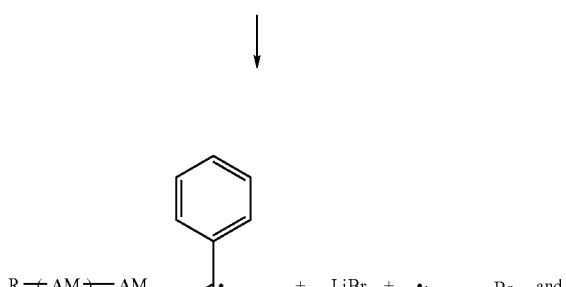

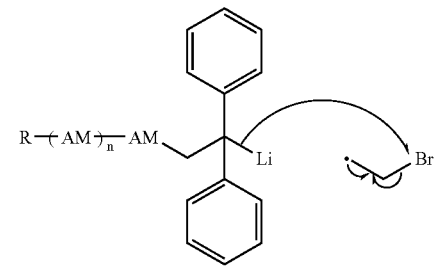

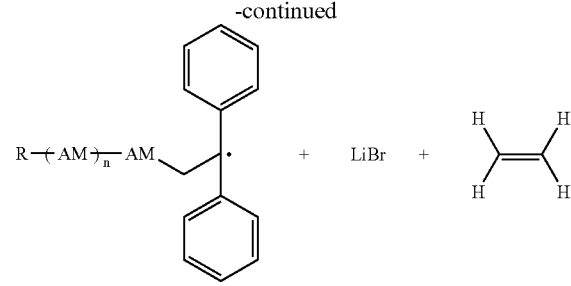

As two radicals can be coupled to form a bond, chains with capped free radical living ends can couple with each other "head-to-head" and form a reversibly coupled polymer.

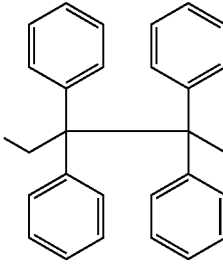

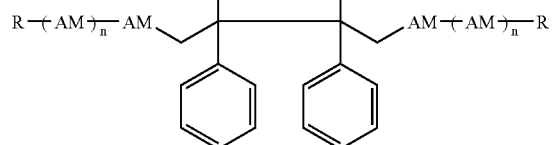

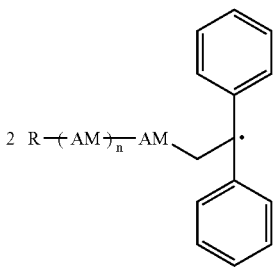

(an example of the reversibly coupled polymer)

It should be understood that, depending upon the specific structure of an end-capped AM chain, the free radical species may exist in different forms dictated by an equilibrium. As such, the free radical may migrate within the capping agent or along the AM chain. For example, an equilibrium can be

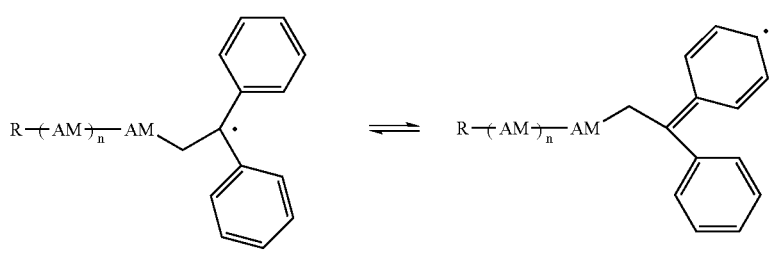

Therefore, the reversibly coupled polymer may also be the product as shown below.

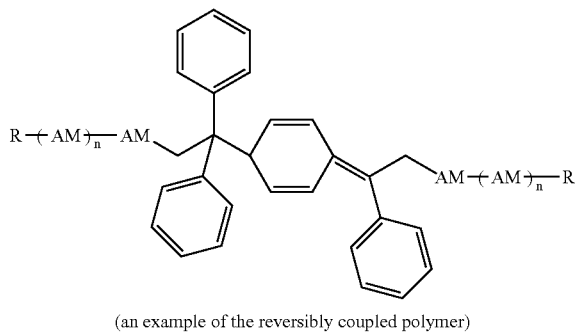

(an example of the reversibly coupled polymer)

It should also be noted that, for the HIPS process, during the polymerization of the rubber/monomer mixture, the styrene monomer polymerizes to form a matrix phase and grafts onto the polybutadiene rubber. The majority of the grafting will occur via any stable free radical groups which are pendant from the polybutadiene polymer chain.

Alkanes with highly substituted carbon-carbon bond can be cleaved to free radicals by homolytic disassociation under the influence of thermal energy. The bond that is formed by coupling the two free radical electrons (unpaired electrons) is thus a relatively weak bond. The energy of disassociation is mainly determined by the type and size of the respective substituents. The formed highly substituted free radicals are relatively stable.

According to the present invention, a HCG functionalized end-capped AM chain or a reversibly coupled end-capped polymer, optionally after its isolation, can be disassociated or decoupled and therefore give free radical species, upon e.g. heating, or HIPS processing. The homolytic disassociation or decoupling first produces end-capped AM chains with free radical as shown in Scheme (I), which then optionally can be further de-capped, giving a polymer chain consisting of essentially AM monomers with free radical. It is this free radical that will be utilized as the "primary radical" to initiate further radical polymerization with one or more, same or different, free radical polymerizable monomers (FM) in a copolymerization, such as HIPS grafting with styrene monomers.

When free radical polymerizable monomers (FM) are added in the presence of the free radical, free radical polymerization is initiated. Free radical polymerization can be accomplished in bulk, suspension, solution, or emulsion. As a skilled artisan can appreciate, a typical free radical polymerization comprises four elementary steps: initiation, propagation, termination, and chain transfer, which are obvious and will not be explained in details in this application.

Free radical polymerizable monomers used in the present invention are those monomers which are sufficiently susceptible to free-radical polymerization condition, for example, monosubstituted or unsymmetrically (1,1-) disubstituted ethylenes. Exemplary free radical polymerizable monomers include, but are not necessarily limited to, styrene, α-methyl styrene, ethyl styrene, propyl styrene, p-vinyl toluene, p-amino styrene, diethylaminostyrene (all isomers), vinyl biphenyl, vinyl naphthalene, vinyl anthracene, acrylonitrile, methacrylonitrile, itaconic acid, itaconic anhydride, methacrylic acid, methyl methacrylate, ethyl methacrylate, propyl methacrylate, (all isomers), butyl methacrylate (all isomers), 2-ethylhexyl methacrylate, isobornyl methacrylate, benzyl methacrylate, phenyl methacrylate, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropylmethoxysilylpropyl methacrylate, dimethoxysilylpropyl methacrylate, diethoxysilylpropyl methacrylate, dibutoxysilylpropyl methacrylate, diisopropoxylsilylpropyl methacrylate, acrylic acid, methyl acrylate, ethyl acrylate, propyl acrylate (all isomers), butyl acrylate (all isomers), 2-ethylhexyl acrylate, isobornyl acrylate, benzyl acrylate, phenyl acrylate, glycidyl acrylate, 2-hydroxyethyl acrylate, hydroxypropyl acrylate (all isomers), hyroxybutyl acrylate (all isomers), N,N-diethylaminoethyl acrylate, triethyleneglycol acrylate, trimethoxysilyipropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropylmethoxysilylpropyl acrylate, dimethoxysilylpropyl acrylate, diethoxysilyipropyl acrylate, dibutoxysilylpropyl acrylate, diisopropoxylsilylpropyl acrylate, acrylamide, N-methyl acrylamide, N,N-dimethyl acrlyamide, N-n-butylacrylamide, N-tert-butylacrylamide, N-methylolacrylamide, N-ethylolacrylamide, methacrylamide, dimethylaminopropyl methacrylamide, N-tert-butylmethacrylamide, N-n-butylmethacrylamide, N-methylolmethacrylamide, N-ethylolmethacrylamide, vinyl benzoic acid (all isomers), α-methylvinyl benzoic acid (all isomers), diethylamino α-methylstyrene (all isomers), p-vinylbenzene sulfonic acid, p-vinylbenzene sulfonic acid sodium salt, vinyl acetate, vinyl butyrate, vinylbenzoate, vinyl chloride, vinyl fluoride, vinyl bromide, vinyltrimethylsilane, tetrafluoroethylene, chlorotrifluoroethylene, maleic anhydride, N-phenylmaleimide, N-vinylpyrrolidone, N-vinylcarbazole, crotonic acid, methyl crotonate, cyclopentene, cyclohexene, cycloheptene, cyclooctene, norbornene, cyclic vinyl ethers, 2,3-dihydrofuran, 3,4-dihydropyran, allylic alcohol, vinylethylene carbonate, diethylfumarate, vinyl alkyl ethers such as ethyl vinyl ether, isoprene, chloroprene, ethylene, propylene, butadiene, and the like, and the mixture thereof.

In a specific embodiment of the present invention, the anionic initiator is n-butyl lithium, the AM is 1,3-butadiene, the capping agent is DPE, the single electron transfer agent is EDB, and the FM is styrene. Without being bound by any theory, the products are believed to be a substantially pure product or a mixture of products as shown below.

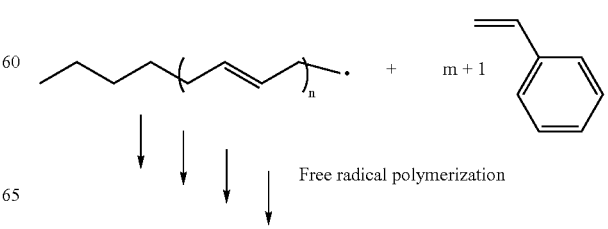

Free radical polymerization

-continued

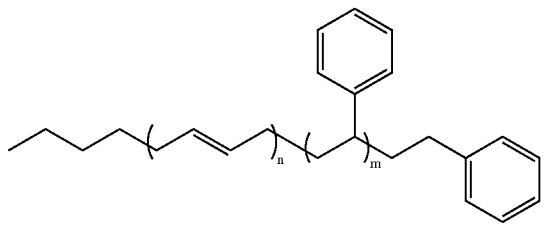

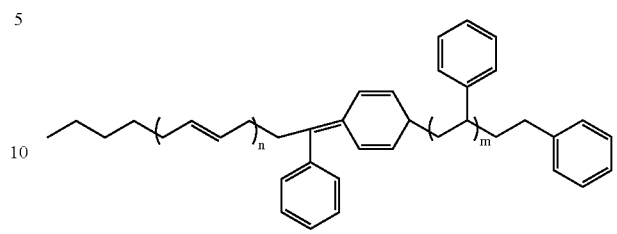

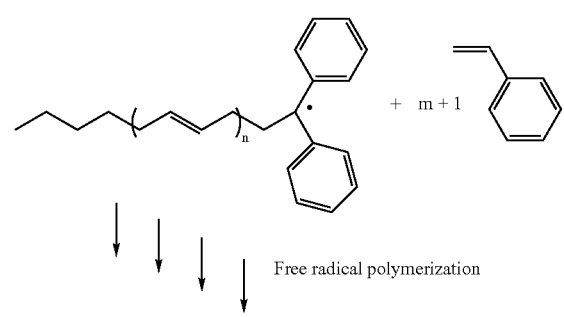

, and

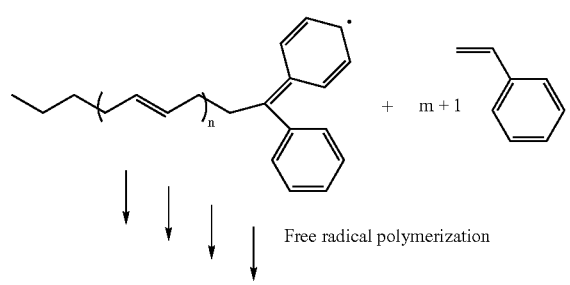

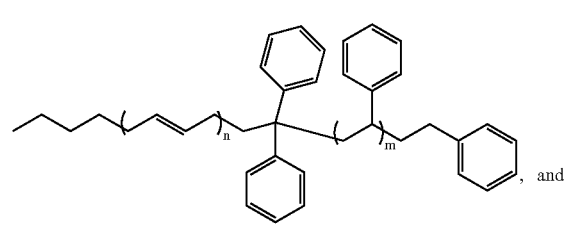

Gel Permeation Chromatography (GPC), alternatively known as Size Exclusion Chromatography (SEC), can be employed in the present invention to determine polymer molecular weight distribution.

As one of its many merits, the process of the present invention is very useful in preparing HIPS polymers wherein the rubber is typically dispersed throughout the polystyrene or polystyrene-acrylonitrile matrix phase. It provides an improvement over typical HIPS polymers in that the grafting of the vinyl aromatic onto the diene polymer chains via free radical polymerization results in reduced particle size and improved dispersion between the diene and vinyl aromatic domains. This leads to improved physical and optical properties.

EXAMPLES

The following examples are provided as an illustration of a preferred embodiment and the invention should not be construed as being limited to the same.

Example 1

Butadiene polymers were prepared and terminated with diphenylethylene and ethylenedibromide. 3.23 lbs of hexane and 7.67 lbs of a blend of 22.2% 1,3-butadiene in hexane were charged to a 2 gallon stainless steel reactor. 4.07 mmol nBuLi was charged to the reactor and the reactor was heated to 120° F. for 3.5 hrs. 2.26 mmol 2,2-di(tetrahydrofuryl)propane was then added to the reactor. After 1 hour, collected samples in 700 ml crown-capped, $N_2$ purged bottles. Sample #1 containing 326.9 g of polymer cement was treated with 6 mmol isopropanol ($N_2$ purged)(an excess). Sample #2 containing 336.1 g of cement was collected 30 minutes after addition of 4.52 mmol 1,1-diphenylethylene. 2.04 mmol of 1,2-dibromoethane (EDB) was then added to the reactor. The characteristic orange-red color disappeared within minutes. The reactor contents were dropped into isopropanol (Sample #3). All three samples were coagulated with isopropanol and dried in vacuum oven at 60° C.

The analysis of these polymers is presented in the table below where both the RI and UV (AU) molecular weight data are displayed. It is notable that UV area increases after DPE capping and EDB termination. The percent coupling (% Cplg) represents the fraction of the polymer containing tetraphenylethane groups.

| | | RI | | | | | | | NMR | |
|---|---|---|---|---|---|---|---|---|---|---|
| | | $M_n$ | $M_w$ | $M_p$ | $M_w/M_n$ | % Cplg | Are | DS | % gel | % |
| Sample 1 | contro | 105289 | 110274 | 112404 | 1.05 | — | 293256 | 1.41 | 0. | 9. |
| Sample 2 | DPE | 108944 | 113921 | 116595 | 1.05 | — | 294908 | 1.44 | ND | 12.1 |
| Sample 3 | DPE/EDB | 165407 | 198981 | 227434 | 1.20 | 64.6 | 305435 | 2.11 | ND | 11.9 |

| | | A | | | | | | | | |
|---|---|---|---|---|---|---|---|---|---|---|
| | | $M_n$ | $M_w$ | $M_p$ | $M_w/M_n$ | % Cplg | Are | UV | UV/RI | $M_n^U/M_n^R$ |
| Sample 1 | contro | 107829 | 111096 | 108428 | 1.03 | — | 15421 | Base Peak | 0.05 | 1.02 |
| Sample 2 | DPE | 113388 | 116342 | 114856 | 1.03 | — | 20690 | Base Peak | 0.07 | 1.04 |
| Sample 3 | DPE/EDB | 156027 | 183885 | 223768 | 1.18 | 55.3 | 41075 | Both | 0.13 | 0.94 |

For control purposes the gradient GPC's of these samples were determined and are presented in FIG. 1. "Diene 35" is a commercial polybutadiene made by Firestone Polymers, LLC. "Diene 35" is used in the commercial production of HIPS.

Example 2

Figure 2:
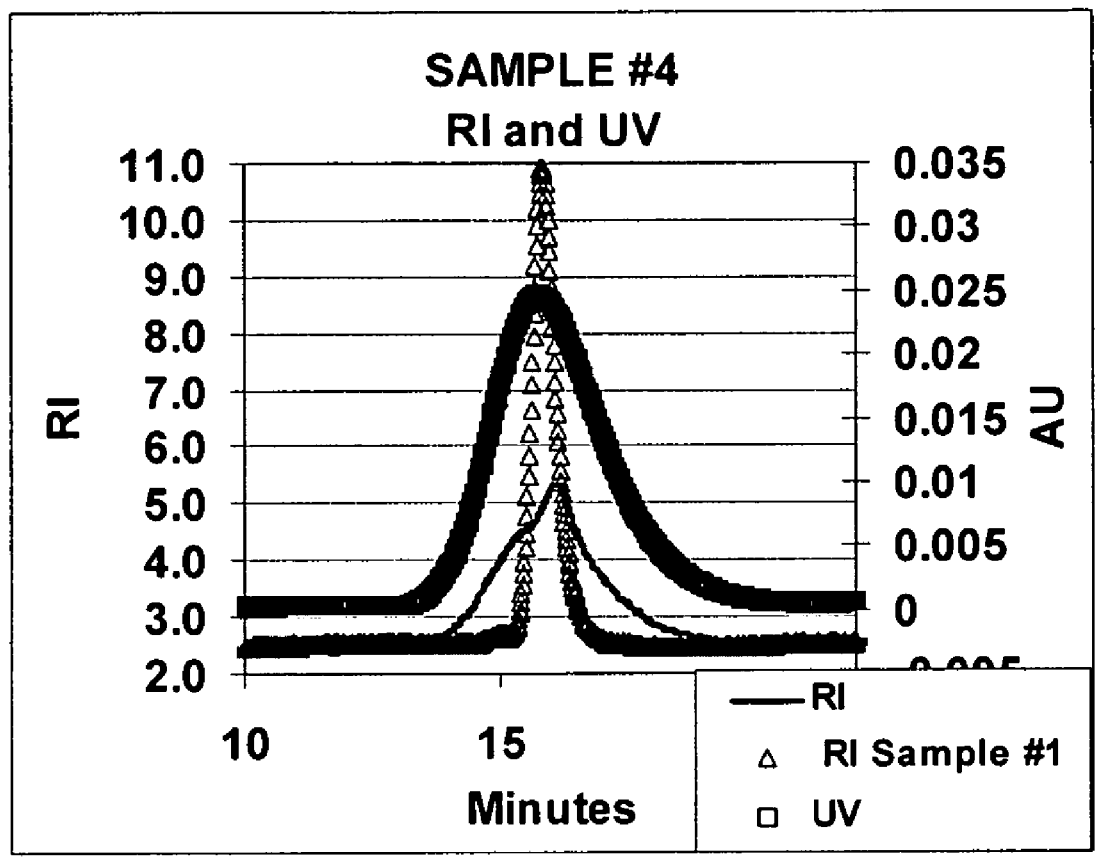
FIG. 2 shows the conventional GPC trace of a sample of butadiene-g-styrene copolymer made from an uncoupled and uncapped poly(1,3-butadiene) in one embodiment of the invention.
Figure 3:
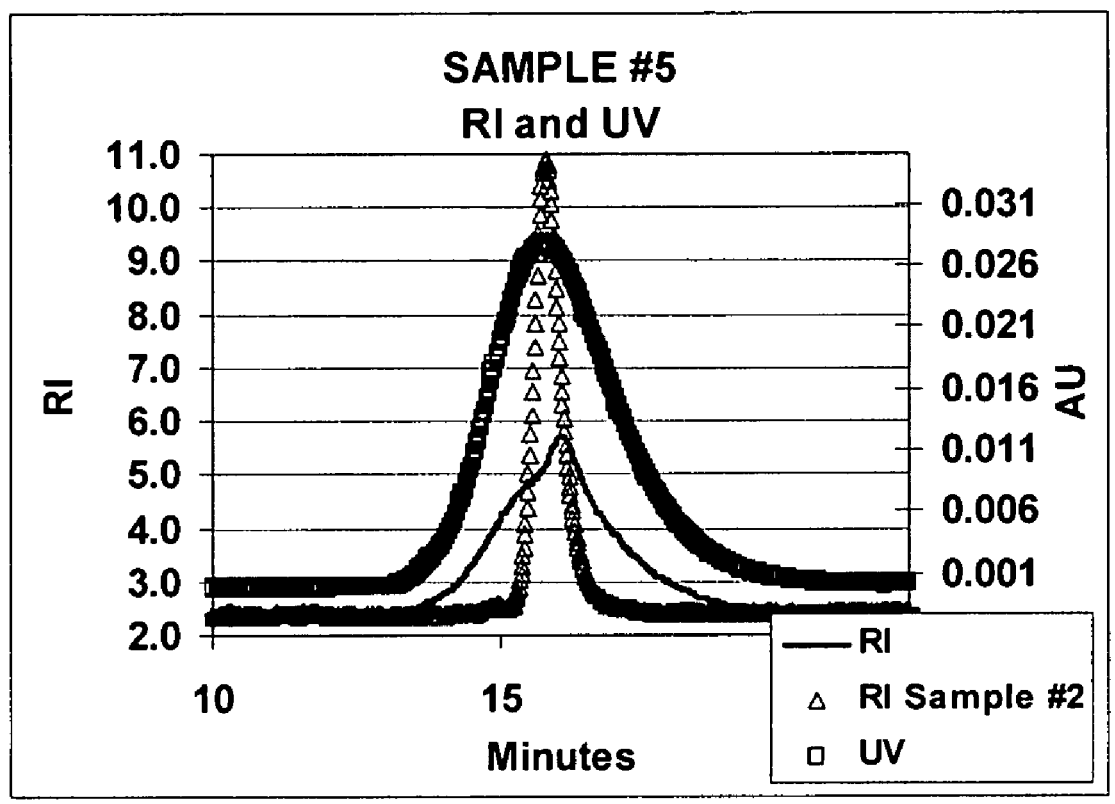
FIG. 3 shows the conventional GPC trace of a sample of butadiene-g-styrene copolymer made from an uncoupled but end-capped poly(1,3-butadiene) in one embodiment of the invention.
Figure 4:
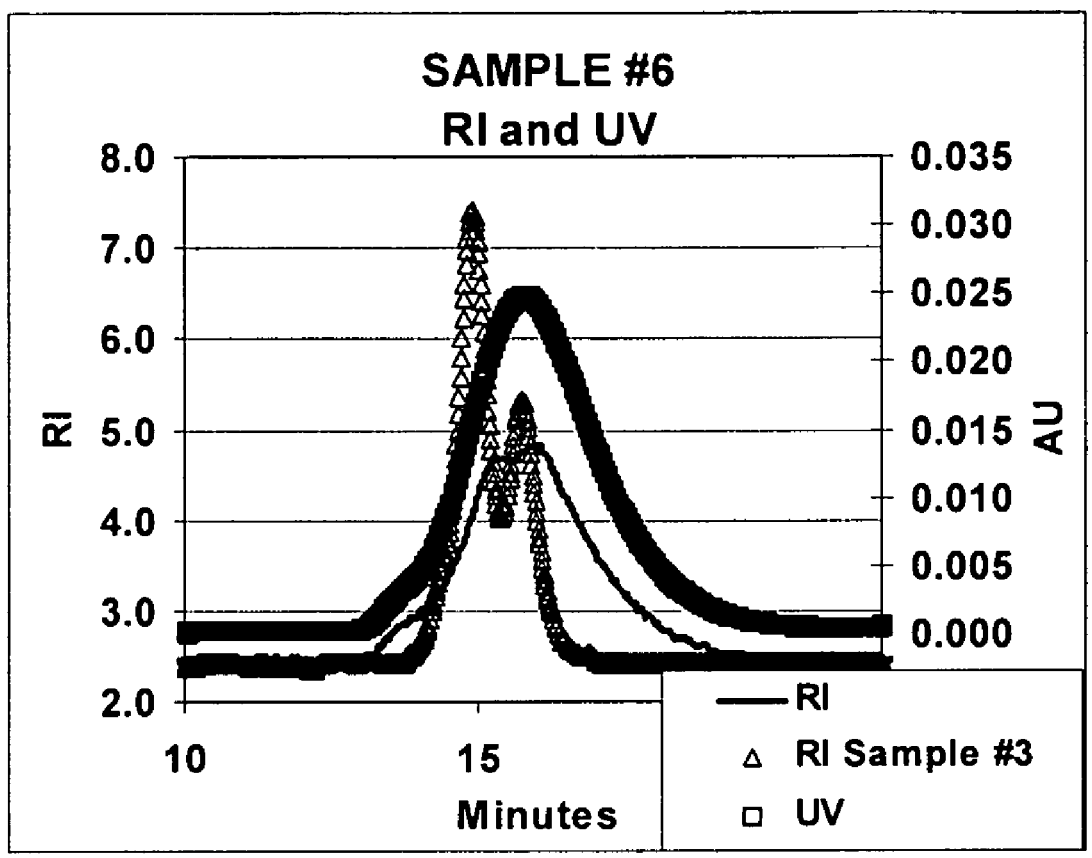
FIG. 4 shows the conventional GPC trace of a sample of butadiene-g-styrene copolymer made from a reversibly coupled end-capped poly(1,3-butadiene) in one embodiment of the invention.
Figure 5:
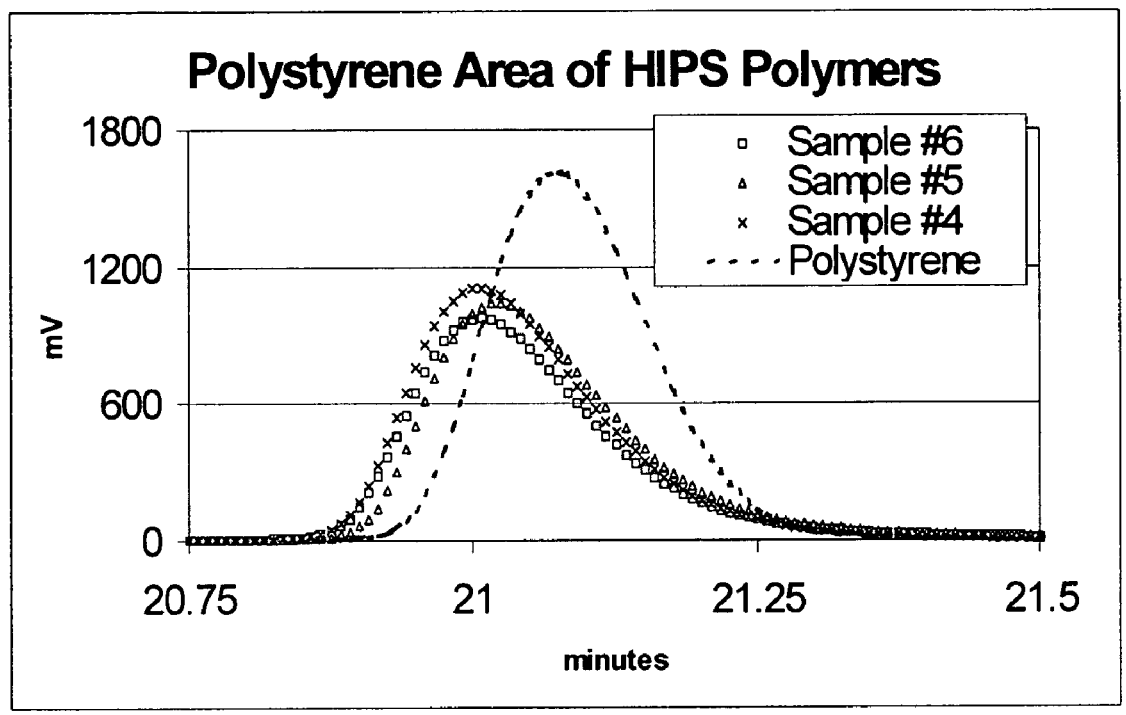
FIG. 5 shows the gradient GPC traces in the polystyrene area of HIPS polymers, in which the samples are polystyrene, butadiene-g-styrene copolymers made from an uncoupled and uncapped poly(1,3-butadiene), an uncoupled but end-capped poly(1,3-butadiene), and a reversibly coupled end-capped poly(1,3-butadiene) in one embodiment of the invention.
Figure 6:
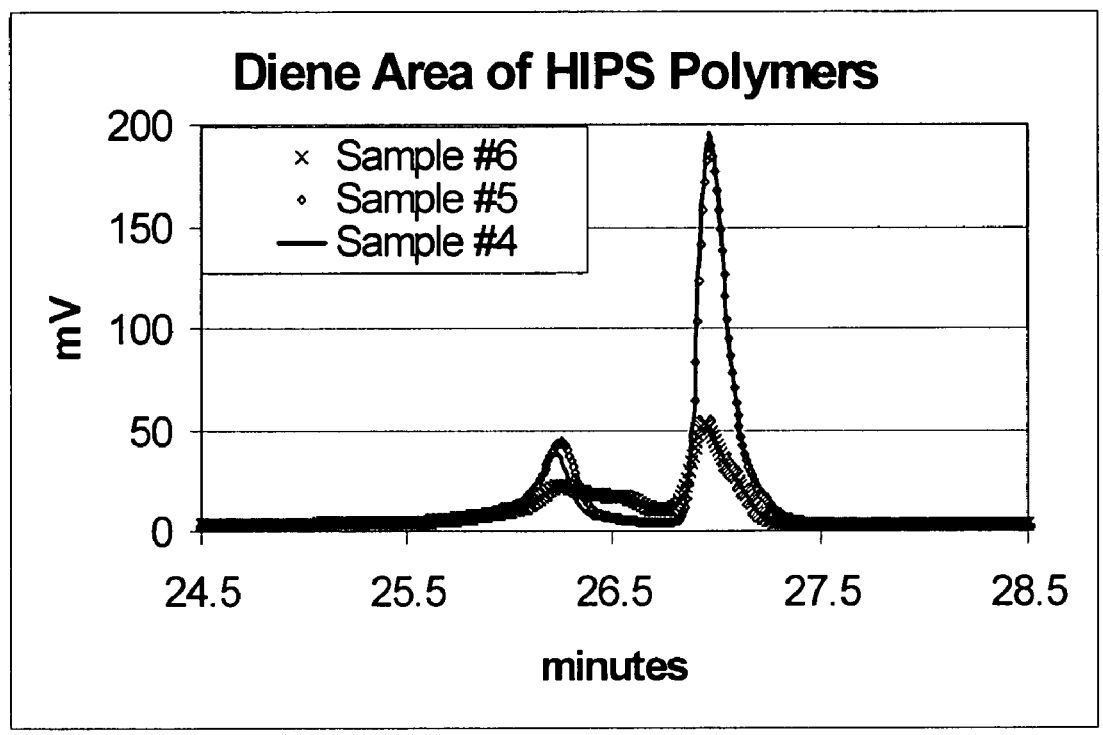
FIG. 6 shows the gradient GPC traces in the polybutadiene area of HIPS polymers, in which the butadiene-g-styrene copolymers are made from an uncoupled and uncapped poly(1,3-butadiene), an uncoupled but end-capped poly(1,3-butadiene), and a reversibly coupled end-capped poly(1,3-butadiene) in one embodiment of the invention.

The materials from Example 1 were subjected to typical HIPS screening experiments as described below. The purpose of Example 2 is to test whether the presence of the functional group promotes grafting to polystyrene during thermal polymerization of styrene monomer. 4.5 g of each sample from Example 1 was dissolved in 45 g of styrene monomer and 0.1 g of Irganox 1076 (antioxidant) at ambient temperature in a $N_2$ purged bottle by mixing on a rotating wheel. Approximately 10 g of each mixture was transferred to a small pipe bomb (approximately 25 ml volume). The three samples were heated in a 135° C. circulating oven for 3 hours, then removed and allowed to cool. The samples were transferred to small aluminum pans and the unreacted styrene monomer allowed to be evaporated in a hood overnight. Then the samples were finished in a vacuum oven at 90° C. for 3 hours. Respectively, Sample #1, Sample #2, and Sample #3 base polymer from Example 1 were used to prepare the HIPS polymers Sample #4, Sample #5, and Sample #6. Polymers with unreacted styrene removed were subjected to conventional GPC and gradient GPC. The HIPS samples were analyzed by conventional GPC (also known as SEC), and the GPC traces are presented along with the GPC of each base polymer in FIGS. 2, 3, and 4. The samples were also analyzed by Gradient GPC (liquid chromatography for polymers; gradient from 100% acetonitrile to 100% THF), and Gradient GPC in the styrene and diene areas are presented FIGS. 5 and 6. As can be seen in the graphs of the Gradient GPC's, the diene area is significantly reduced and additional peaks for BR-g-PS have appeared for Sample #6, which was made from Sample #3, as compared to the other two control polymers in Samples #4 and #5, which were respectively made from Samples #1 and #2. The significantly reduced diene area in gradient GPC of Sample #6 is what is expected for more efficient grafting of the diene polymer.

The analysis of these polymers is presented in the table below where RI, UV (AU) molecular weight, and NMR data are displayed.

| HIPS Polymer | Base Polymer | RI | | | | | NMR | |
|---|---|---|---|---|---|---|---|---|
| | | $M_n$ | $M_w$ | $M_p$ | $M_w/M_n$ | Area | % Styrene | %1,2 (Bd = 100) |
| Sample #4 | Sample #1 | 112560 | 209837 | 140318 | 1.86 | 356008 | 82.8 | 10.1 |
| Sample #5 | Sample #2 | 109741 | 217604 | 140103 | 1.98 | 421921 | 80.9 | 12.3 |
| Sample #6 | Sample #3 | 104862 | 253919 | 155995 | 2.42 | 382518 | 80.5 | 12.1 |

| | | AU | | | | | | |
|---|---|---|---|---|---|---|---|---|
| | | $M_n$ | $M_w$ | $M_p$ | $M_w/M_n$ | Area | UV/RI area | $M_n^{UV}/M_n^{RI}$ |
| Sample #4 | Sample #1 | 98565 | 209470 | 182390 | 2.13 | 3785794 | 10.6 | 0.876 |
| Sample #5 | Sample #2 | 99101 | 210018 | 175862 | 2.12 | 4304949 | 10.2 | 0.903 |
| Sample #6 | Sample #3 | 99610 | 226314 | 169302 | 2.27 | 3865621 | 10.1 | 0.950 |

Example 3

In a similar manner to Examples 1 and 2, additional polymers were prepared with styrene, α-methylstyrene, diisopropylbenzene and just diene before termination with DPE and EDB. 3.54 lbs hexane and 7.37 lbs of a 22.2% 1,3-butadiene in hexane blend were charged to a 2 gallon stainless steel reactor. 4.07 mmol nBuLi was charged to the reactor and the reactor was heated to 120° F. for 3.5 hrs. 2.26 mmol 2,2-di(tetrahydrofuryl)propane was then added to the reactor. After 30 minutes, 8 (eight) samples were dropped into 700 ml crown-capped, $N_2$ purged bottles. The 8 samples were labeled with Sample #7, #8, #9, #10, #11, #12, #13, and #14.

For Samples #7 and #8, no additional monomer was added.

Samples #9 and #10 were treated with approximately 1.4-1.8 ml of 2.28 molar styrene in hexane to add approximately 10 units of styrene (abbreviated as Sty-10) to each chain-end.

Samples #11 and #12 were treated with approximately 0.75 ml of α-methyl styrene to add approximately 2 monomer units (abbreviated as α-MeSty-2) to each chain-end.

Samples #13 and #14 were treated with approximately 0.80 ml of di-isopropenylbenzene to add approximately 2 monomer units (abbreviated as DIPB-2) to each chain-end.

All the samples #7-#14 were each treated with approximately 0.4 mmol 1,1-diphenylethylene (DPE). After 1 hour, Samples #8, #10, #12, and #14 were each treated with approximately 0.2 mmol 1,2-dibromoethane (EDB).

After 18 hours, isopropanol and BHT (antioxidant) was added to each bottle to coagulate. Samples were air-dried over three days and then vacuum dried at 60° C. for three hours.

All the samples #7-#14 were analyzed by GPC. The results are presented in the table below where both the RI and UV (AU) molecular weight data are displayed. Each sample was dissolved in styrene and thermally polymerized at 140° C. for 3 hours.

Figure 10:
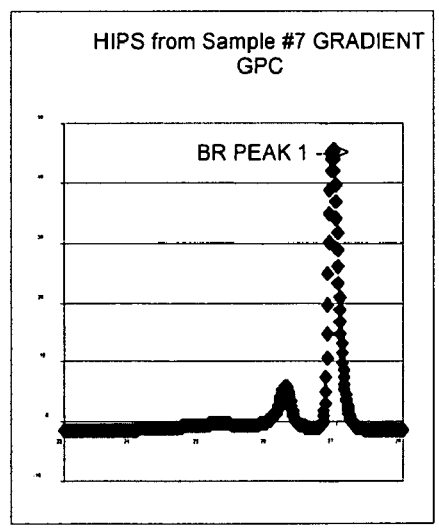
FIG. 10 shows the gradient GPC trace of a butadiene-g-styrene copolymer (HIPS) made from an uncoupled but end-capped poly(1,3-butadiene) in one embodiment of the invention.
Figure 11:
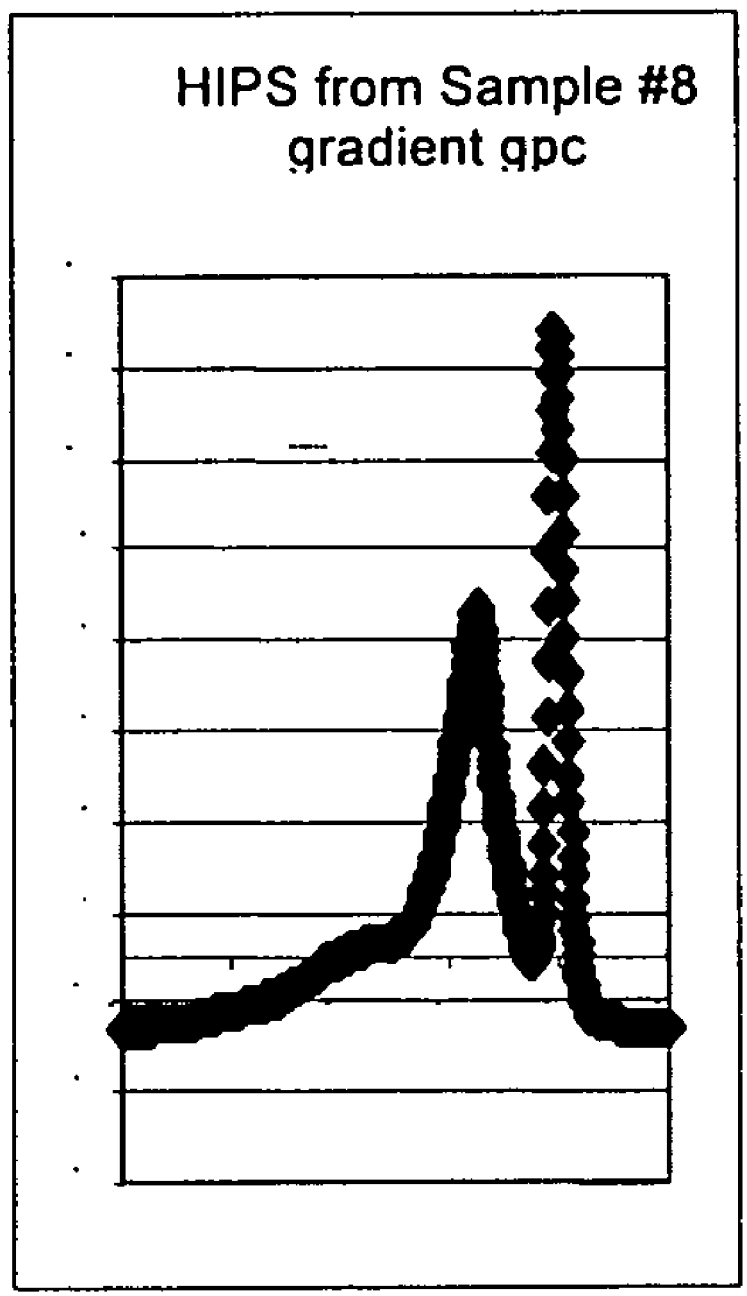
FIG. 11 shows the gradient GPC trace of a butadiene-g-styrene copolymer (HIPS) made from a reversibly coupled end-capped poly(1,3-butadiene) with an allylic penultimate group to the capping position in one embodiment of the invention.
Figure 12:
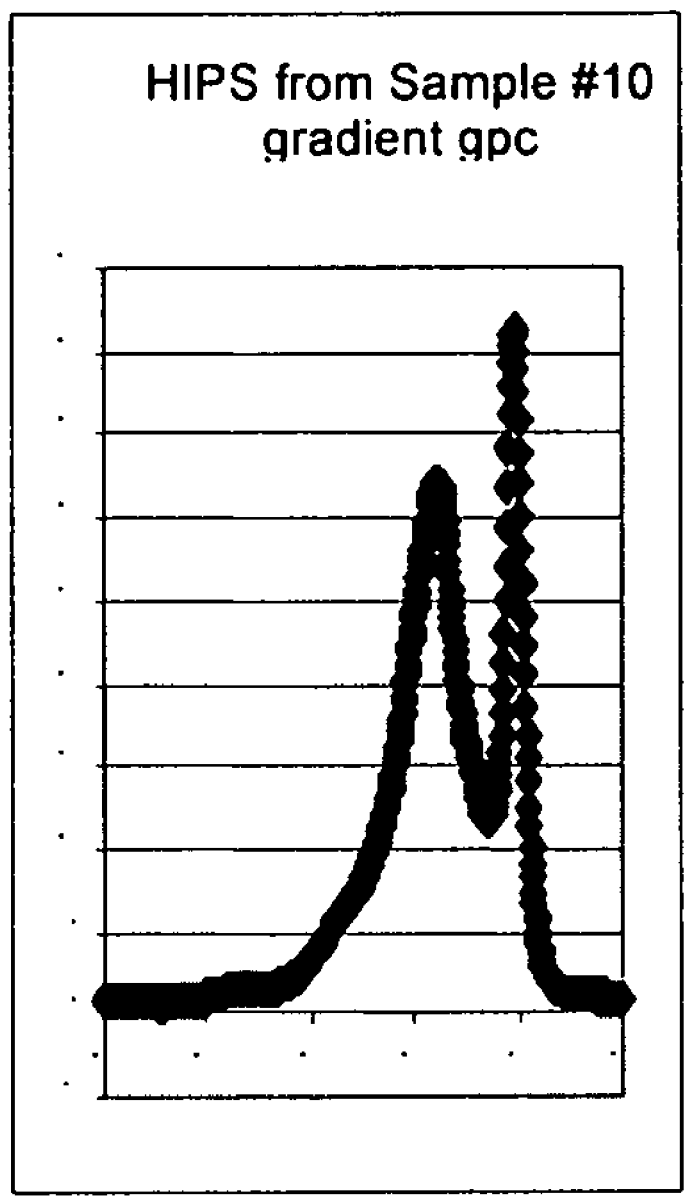
FIG. 12 shows the gradient GPC trace of a butadiene-g-styrene copolymer (HIPS) made from a reversibly coupled end-capped poly(1,3-butadiene) with a styrenic penultimate group to the capping position in one embodiment of the invention.
Figure 13:
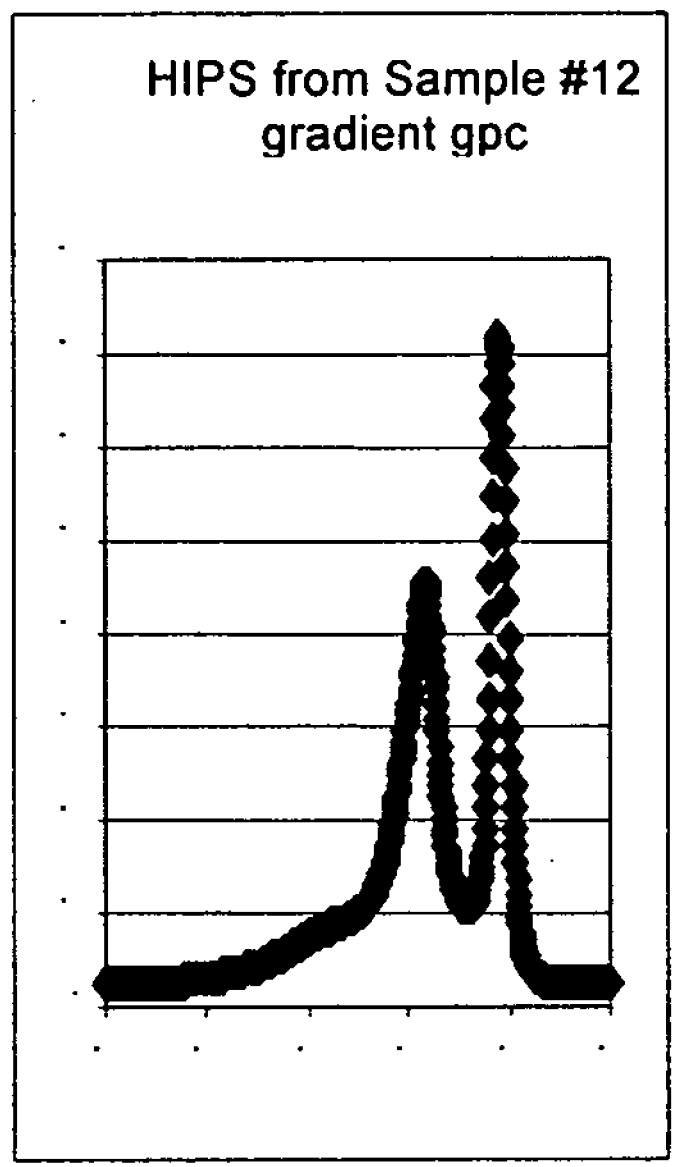
FIG. 13 shows the gradient GPC trace of a butadiene-g-styrene copolymer (HIPS) made from a reversibly coupled end-capped poly(1,3-butadiene) with a α-methylstyrenic penultimate group to the capping position in one embodiment of the invention.
Figure 14:
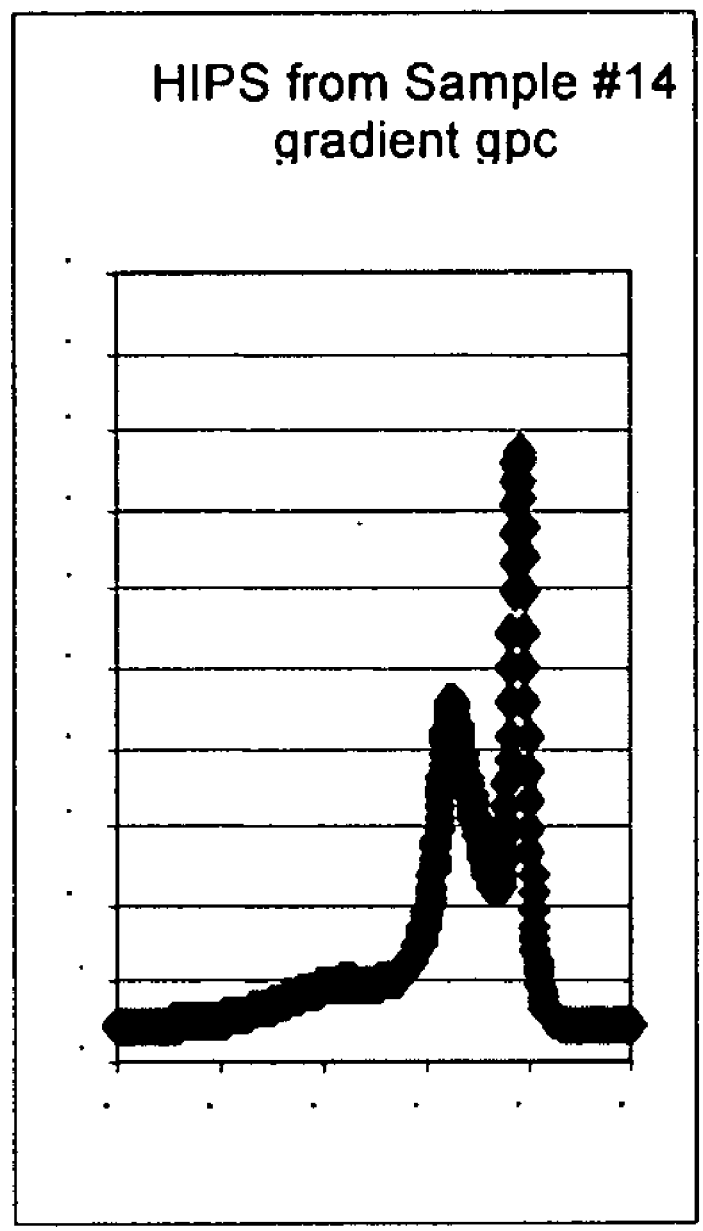
FIG. 14 shows the gradient GPC trace of a butadiene-g-styrene copolymer (HIPS) made from a reversibly coupled end-capped poly(1,3-butadiene) with an isopropenyl(α-methyl)styrenic penultimate group to the capping position in one embodiment of the invention.

1" remains) but a broad bimodal peak appears at 24-27 minutes. This BR grafted polystyrene peak is larger than the one observed for HIPS made from the uncoupled DPE, Sample #7 (FIG. 10). This verifies that a coupled DPE functional group is capable of dissociating at 140° C. and forming free-radicals that will polymerize styrene.

The next group of graphs (FIGS. 11, 12, 13, and 14) shows Gradient GPC's of the HIPS samples prepared from dibromethane coupled DPE terminated BR where the group penultimate to the DPE is either allylic (Sample #8), styrenic (Sample #10), α-methylstyrenic (Sample #12), or isopropenyl(α-methyl)styrenic (Sample #14). The purpose of studying the penultimate group effect was to see if the penultimate group affected the reactivity of the radicals formed by the dissociation of the coupled DPE species of the polymers during the HIPS process.

It is noted that for the styrenic, α-methylstyrenic, and the isopropenyl(alphamethyl)styrenic base polymers, the GPC showed a lower level of coupling that indicated a higher level of termination than observed for the allylic base polymer (see Table for Example #3). Even so, the BR polymer with a styrenic penultimate end-group appears to give the highest degree of grafting.

TABLE for Example #3

| | Sty Der-DP/DPE | RI | | | | |
| --- | --- | --- | --- | --- | --- | --- |
| | | $M_n$ | $M_w$ | $M_w/M_n$ | $M_p$ | Cplg |
| Sample #8 | ---/DPE/- | 115315 | 120164 | 1.04 | 118442 | |
| Sample #9 | ---/DPE/EDB | 168367 | 196761 | 1.17 | 118898 | |
| | | | | | 230619 | 64.5% |
| Sample #10 | Sty-10/DPE/- | 114942 | 118090 | 1.03 | 119357 | |
| Sample #11 | Sty-10/DPE/EDB | 168240 | 195745 | 1.16 | 122894 | |
| | | | | | 232624 | 62.1% |
| Sample #11 | a-MeSty-2/DPE/- | 116090 | 120990 | 1.04 | 119076 | |
| Sample #12 | a-MeSty-2/DPE/EDB | 148957 | 176248 | 1.18 | 120459 | |
| | | | | | 233938 | 44.9% |
| Sample #13 | DIPB-2/DPE/- | 158954 | 200420 | 1.26 | 120747 | |
| | | | | | 236296 | 48.3% |
| Sample #14 | DIPB-2/DPE/EDB | 181916 | 247760 | 1.36 | 120622 | |
| | | | | | 238972 | 60.0% |

| | Sty Der-DP/DPE | UV | | | | | | | |
| --- | --- | --- | --- | --- | --- | --- | --- | --- | --- |
| | | $M_n$ | $M_w$ | $M_w/M_n$ | $M_p$ | Total Area | $M_n^{RI}/M_n^{UV}$ | $M_p^{RI}/M_p^{UV}$ | $Area^{RI}/Area^{UV}$ |
| Sample #7 | ---/DPE/- | 115118 | 117819 | 1.02 | 117405 | 33410 | 1.00 | 1.01 | 9.34 |
| Sample #8 | ---/DPE/EDB | 176217 | 202307 | 1.15 | 231645 | 47689 | 0.96 | 0.51 | 6.76 |
| Sample #9 | Sty-10/DPE/- | 115860 | 118607 | 1.02 | 118473 | 74684 | 0.99 | 1.01 | 4.31 |
| Sample #10 | Sty-10/DPE/EDB | 166726 | 192938 | 1.16 | 234530 | 107870 | 1.01 | 0.52 | 2.94 |
| Sample #11 | a-MeSty-2/DPE/- | 115037 | 117762 | 1.02 | 118966 | 35245 | 1.01 | 1.00 | 9.40 |
| Sample #12 | a-MeSty-2/DPE/EDB | 148737 | 176329 | 1.19 | 118107 | 76782 | 1.00 | 1.02 | 4.19 |
| Sample #13 | DIPB-2/DPE/- | 163536 | 205100 | 1.25 | 120886 | 106897 | 0.97 | 1.00 | 3.03 |
| Sample #14 | DIPB-2/DPE/EDB | 194126 | 267148 | 1.38 | 121753 | 151516 | 0.94 | 0.99 | 2.12 |

Example 4

Each of the 8 samples was dissolved in styrene and thermally polymerized at 140° C. for 3 hours. Samples were worked up as before and Gradient GPC analysis was done.

Figure 7:
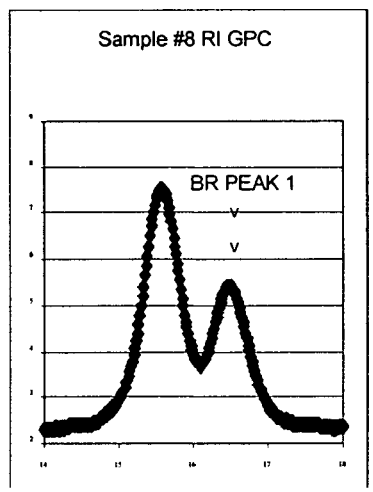
FIG. 7 shows the RI GPC trace of a reversibly coupled end-capped poly(1,3-butadiene) in one embodiment of the invention.
Figure 8:
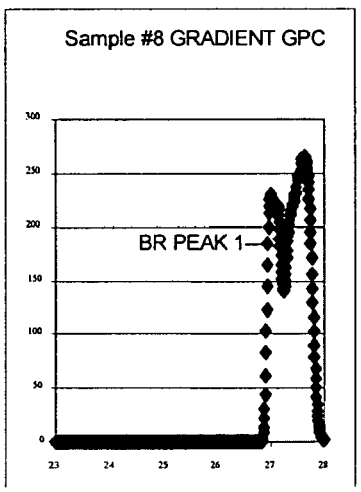
FIG. 8 shows the gradient GPC trace of a reversibly coupled end-capped poly(1,3-butadiene) in one embodiment of the invention.
Figure 9:
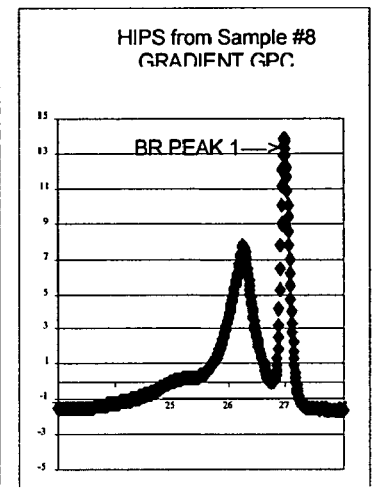
FIG. 9 shows the gradient GPC trace of a butadiene-g-styrene copolymer (HIPS) made from a reversibly coupled end-capped poly(1,3-butadiene) in one embodiment of the invention.

The first series of graphs (FIGS. 7, 8, 9 and 10) shows the results from BR-DPE coupled with dibromethane. The GPC of Sample #8 (FIG. 7) shows 64.5% coupling occurred. "BR PEAK 1" is again seen in the gradient GPC (FIG. 8) along with the coupled DPE material. As seen in FIG. 9, after reacting with styrene, the DPE peak disappears ("BR PEAK The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of converting an anionic living end to a protected free radical "living" end, comprising reacting the anionic living end with a capping agent (CA) to produce an end-capped anionic living end;
converting the ionic bond of the end-capped anionic living end to a homolytically cleavable covalent bond (HCCB) by functionalization with a homolytically cleavable group (HCG);
breaking the HCCB bond homolytically to form an end-capped free radical; and
optionally de-capping the end-capped free radical end to form an uncapped free radical.

2. The method according to claim 1, in which the capping agent (CA) is a steric hindering compound as shown below, wherein at least one of $R_{12}$ and $R_{14}$ are hindering groups selected from cyclic and/or polycyclic aryl groups containing from 6 to 18 carbon atoms.

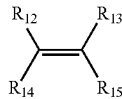

3. The method according to claim 1, in which the capping agent (CA) is 1,1-diphenylethylene (DPE).

4. The method according to claim 1, in which the converting of the ionic bond of the end-capped anionic living end to a homolytically cleavable covalent bond (HCCB) is realized by
reacting the end-capped anionic living end with a single electron transfer agent (SETA) to convert the end-capped anionic living end to an end-capped free radical end; and
reversibly coupling the-end-capped free radical ends.

5. The method according to claim 4, in which single electron transfer agent is selected from the group consisting of benzyl bromide, 1,2-dibromoethane, 1,2-dichloroethane, and mixture thereof.

6. The method according to claim 4, in which the single electron transfer agent is 1,2-dibromoethane.

7. The method according to claim 1, in which the anionic living end is formed by
reacting an anionic initiator with an anionically polymerizable monomer (AM); and
propagating the AM chain with the anionic living end to a predetermined length with more, same or different, AMs.

8. The method according to claim 7, in which the anionically polymerizable monomer has the following formula:

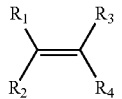

in which at least one of the $R_1$, $R_2$, $R_3$, and $R_4$ groups is vinyl or aryl.

9. The method according to claim 7, in which the anionically polymerizable monomer is a conjugated diene.

10. The method according to claim 9, in which the conjugated diene is selected from the group consisting of 1,3-butadiene, Isoprene (2-methyl-1,3-butadiene), 2-ethyl-1,3-butadiene, 2,3-dimethyl-1,3-butadiene, piperylene (1,3-pentadiene), 2-methyl-1,3-pentadiene, 3-methyl-1,3-pentadiene, 4-methyl-1,3-pentadiene, 2,4-dimethyl-1,3-pentadiene, 1,3-hexadiene, and the mixture thereof.

11. The method according to claim 7, in which the anionically polymerizable monomer is selected from the group consisting of ethylene, 1,2-diphenyl-4-methyl-1-hexene, styrene, α-methylstyrene, p-methylstyrene, vinyl toluene, vinyl anthracene, vinyl pyridines such as 2-vinylpyridine and 4-vinylpyridine, vinyl naphthalene such as 1-vinylnaphthalene, 2-vinylnaphthalene, 1-α-methylvinylnaphthalene, 2-α-methylvinylnaphthalene, and the mixture thereof.

12. The method according to claim 7, in which the anionically polymerizable monomer is selected from the group consisting of 1,3-butadiene, isoprene, styrene, α-methylstyrene, p-methylstyrene, and the mixture thereof.

13. The method according to claim 7, in which the anionic initiator is an organolithium compound.

14. The method according to claim 7, in which the anionic initiator is a monolithium compound represented by the formula of $R_5Li$, wherein $R_5$ is a hydrocarbyl group containing 1 to 20 carbon atoms per $R_5$ group.

15. The method according to claim 14, in which the $R_5$ is an alkyl, cycloalkyl, cycloalkyl-alkyl, alkyl-cycloalkyl, alkenyl, aryl, or alkylaryl radical.

16. The method according to claim 14, in which the $R_5$ is selected from the group consisting of methyl, ethyl, n-propyl, isopropyl, n-butyl, isobutyl, t-butyl, n-amyl, isoamyl, n-hexyl, n-octyl, n-decyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, 4-butylcyclohexyl, cyclopentyl-methyl, cyclohexyl-ethyl, cyclopentyl-ethyl, methyl-cyclopentylethyl, 4-cyclohexylbutyl, vinyl, propenyl, 4-phenylbutyl, phenyl, naphthyl, 4-butylphenyl, p-tolyl, and the mixture thereof.

17. The method according to claim 7, in which the anionic initiator is n-butyl lithium.

18. The method according to claim 7, in which the anionic initiator is a multiple-lithium compound.

19. The method according to claim 18, in which the multiple-lithium compound is selected from the group consisting of 1,4-dilithiobutane, 1,5-dilithiopentane, 1,10-dilithiodecane, 1,20-dilithioeicosane, 1,4-dilithiobenzene, 1,4-dilithionaphthalene, 1,10-dilithioanthracene, 1,2-dilithio-1,2-diphenylethane, 1,3-di-(2-(2-lithioi4-methyl)pentyl) benzene, 1,3,5 -trilithiopentane, 1,5,1 5-trilithioeicosane, 1,3,5 -trilithiocyclohexane, 1,3,5,8-tetralithiodecane, 1,5,10, 20-tetralithioeicosane, 1,2,4,6-tetralithiocyclohexane, 4,4'-dilithiobiphenyl, and the mixture thereof.

20. The method according to claim 7, in which the amount of the anionic initiator ranges between 0.1 millimoles to 100 millimoles per hundred grams of the anionically polymerizable monomer.

21. The method according to claim 7, in which the formed anionic living end has the formula as shown below:

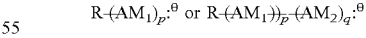

wherein the R group is n-butyl, $AM_1$ is 1,3-butadiene, $AM_2$ is styrene, α-methylstyrene, or p-methylstyrene, and p and q are any desired integral number.

22. The method according to claim 7, further comprising, when the anionically polymerizable monomer is a conjugated diene monomer, adding a 1,2-microstructure controlling agent.

23. The method according to claim 22, in which the 1,2-microstructure controlling agent is selected from the group consisting of bis(2-oxolanyl) methane; 1,1-bis(2-oxolanyl) ethane; bistetrahydrofuryl propane (2,2-bis(2-oxolanyl) propane); 2,2-bis(5-methyl-2-oxolanyl) propane; 2,2- bis-(3,4,5-trimethyl-2-oxolanyl) propane; 2,5-bis(2-oxolanyl-2-propyl) oxolane; octamethylperhydrocyclotetrafurfurylene (cyclic tetramer); 2,2-bis(2-oxolanyl) butane; and the mixture thereof.

24. The method according to claim 22, in which the 1,2-microstructure controlling agent is 2,2-bis(2-oxolanyl) propane.

25. The method according to claim 7, further comprising adding same or different free radical polymerizable monomers (FM) and initiating free radical polymerization in which the chain of AMs with a free radical, end-capped or not, functions as the free radical initiator.

26. The method according to claim 25, in which the free radical polymerizable monomer is selected from the group consisting of styrene, .alpha.-methyl styrene, ethyl styrene, propyl styrene, p-vinyl toluene, p-amino styrene, diethylaminostyrene (all isomers), vinyl biphenyl, vinyl naphthalene, vinyl anthracene, acrylonitrile, methacrylonitrile, itaconic acid, itaconic anhydride, methacrylic acid, methyl methacrylate, ethyl methacrylate, propyl methacrylate, (all isomers), butyl methacrylate (all isomers), 2-ethylhexyl methacrylate, isobornyl methacrylate, benzyl methacrylate, phenyl methacrylate, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropylmethoxysilylpropyl methacrylate, dimethoxysilyipropyl methacrylate, diethoxysilylpropyl methacrylate, dibutoxysilylpropyl methacrylate, diisopropoxylsilylpropyl methacrylate, acrylic acid, methyl acrylate, ethyl acrylate, propyl acrylate (all isomers), butyl acrylate (all isomers), 2-ethyihexyl acrylate, isobornyl acrylate, benzyl acrylate, phenyl acrylate, glycidyl acrylate, 2-hydroxyethyl acrylate, hydroxypropyl acrylate (all isomers), hyroxybutyl acrylate (all isomers), N,N-diethylaminoethyl acrylate, triethyleneglycol acrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropylmethoxysilylpropyl acrylate, dimethoxysilylpropyl acrylate, diethoxysilylpropyl acrylate, dibutoxysilylpropyl acrylate, diisopropoxylsilylpropyl acrylate, acrylamide, N-methyl acrylamide, N,N-dimethyl acrlyamide, N-n-butylacrylamide, N-tert-butylacrylamide, N-methylolacrylamide, N-ethylolacrylamide, methacrylamide, dimethylaminopropyl methacrylamide, N-tert-butylmethacrylamide, N-n-butylmethacrylamide, N-methylolmethacrylamide, N-ethylolmethacrylamide, vinyl benzoic acid (all isomers), .alpha.-methylvinyl benzoic acid (all isomers), diethylamino .alpha.-methylstyrene (all isomers), p-vinylbenzene sulfonic acid, p-vinylbenzene sulfonic acid sodium salt, vinyl acetate, vinyl butyrate, vinylbenzoate, vinyl chloride, vinyl fluoride, vinyl bromide, vinyltrimethylsilane, tetrafluoroethylene, chlorotrifluoroethylene, maleic anhydride, N-phenylmaleimide, N-vinylpyrrolidone, N-vinylcarbazole, crotonic acid, methyl crotonate, cyclopentene, cyclohexene, cycloheptene, cyclooctene, norbornene, cyclic vinyl ethers, 2,3-dihydrofuran, 3,4-dihydropyran, allylic alcohol, vinylethylene carbonate, diethylfumarate, vinyl alkyl ethers such as ethyl vinyl ether, isoprene, chloroprene, ethylene, propylene, butadiene, and the mixture thereof.

27. The method according to claim 25, in which the free radical polymerizable monomers are styrene and acrylonitrile.

* * * * *